Figure 1:
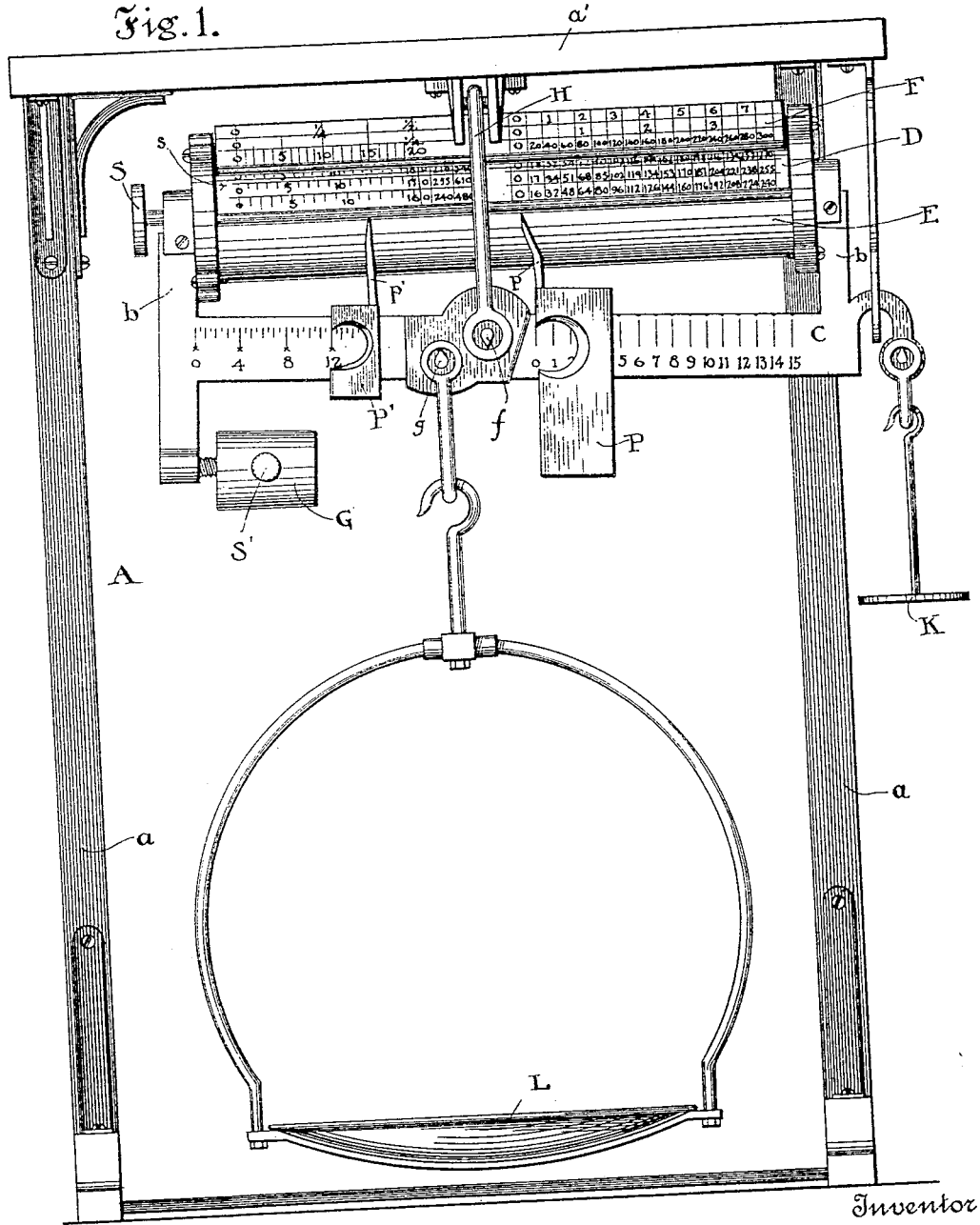

(No Model.) 2 Sheets—Sheet 2.

T. J. DUNLEA.
PRICE SCALE.

No. 597,670. Patented Jan. 18, 1898.

Witnesses  
Inventor  
Thomas Joseph Dunlea  
By Addison G. DuBois, Attorney

UNITED STATES PATENT OFFICE.

THOMAS JOSEPH DUNLEA, OF BINGHAMTON, NEW YORK, ASSIGNOR TO CHARLES F. WRIGHT, OF SUSQUEHANNA, PENNSYLVANIA.

PRICE-SCALE.

SPECIFICATION forming part of Letters Patent No. 597,670, dated January 18, 1898.

Application filed March 8, 1897. Serial No. 626,513. (No model.)

*To all whom it may concern:*

Be it known that I, THOMAS JOSEPH DUNLEA, a citizen of the United States, residing at Binghamton, in the county of Broome and State of New York, have invented certain new and useful Improvements in Price-Scales, of which the following is a specification, reference being had therein to the accompanying drawings.

My invention relates to an improvement in that class of scales known as "price-scales," having particular reference to that class of devices which are attached to scale-beams for the purpose of indicating the exact price of any given weight of material at different rates per pound, and has for its object to provide a means for specifying accurately on a single scale-beam the weight of an article of merchandise in pounds and ounces, while indicating the exact price thereof at a given price rate.

A further object of my invention is to enlarge the capacity of such scales, whereby the cost or value of an article may be read at a glance, even when the weight is expressed as a compound of pounds and ounces and the price rate is denominated by units and fractions thereof.

To these ends my invention consists, primarily, in the following constructions and mechanical arrangements that involve the combination, with a scale-beam, of a rotative cylinder and its attachments which are so disposed relatively as to extend along the path of said beam in proximity thereto, while their suspension is effected in such a manner, by reason of locating the fulcrum-point on said beam intermediate of its ends, that the beam presents balance-arms of unequal length that extend in the same horizontal plane, while the cylinder and its attachments oscillate therewith in a position of stable equilibrium. The short arm of the pair thus presented is intended to bear the load-supporting pivot, while the longer arm is adapted to carry a platform, which is hung therefrom. Each of the arms is provided with a poise or movable weight, while the general adjustment of the organization thus arranged is effected by means of a counterpoise that is so disposed as to compensate for any weight or derangement incurred by the additional parts above mentioned; and my invention further consists in providing each of said arms with a scale or weight-graduations that extend from left to right, those on the short arm indicating ounce-divisions, while those on the long arm designate pound-divisions, and in arranging on the face of said cylinder and its attached column a series of tabulations of price-computations that have strict reference to cross-graduations on the respective arms.

Figure 2:
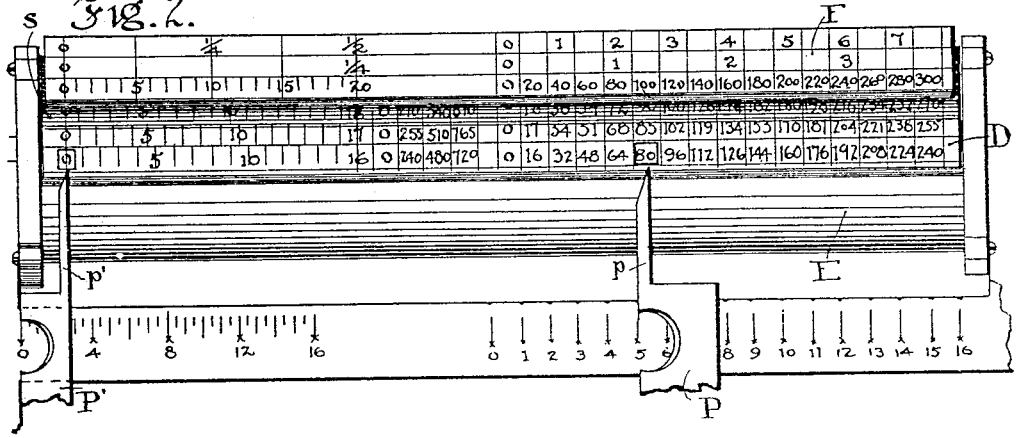
Figure 3:
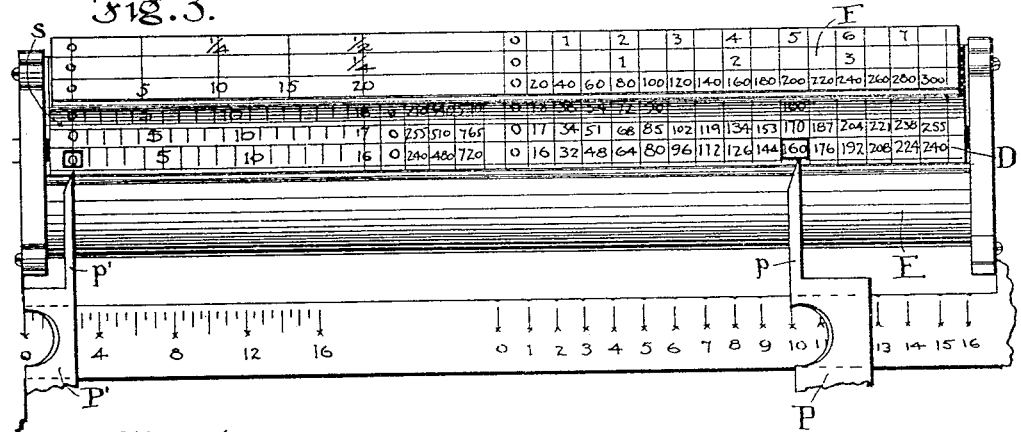
Figure 4:
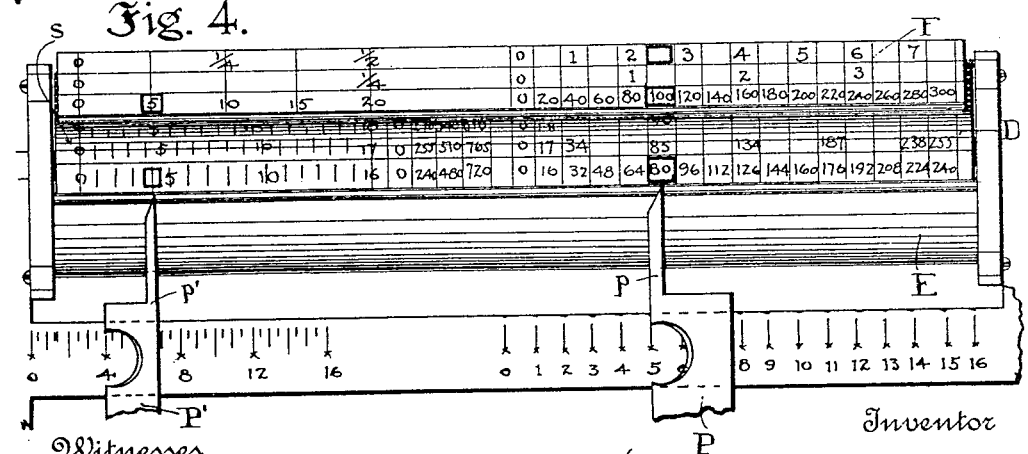

In the accompanying drawings, Figure 1 is a front elevation of my improved scale, while Figs. 2, 3, and 4 represent in like views a detached front elevation of the balance-frame, showing, respectively, the cylinder and poises in different relative positions for the purpose of exemplifying the method of computation.

Like letters of reference indicate like parts in the several figures.

In said drawings, A represents the frame of the scales; C, the scale-beam suspended therefrom; D, the rotative cylinder or drum; E, the casing attachment, and F the stationary column or indicator-plate.

The frame consists of a suitable base having uprights $a\,a$ and a horizontally-extending beam $a'$, which rests on said uprights and which supports a pendent hanger H, that serves as a support and pivot-rest for the scale-beam. The scale-beam is provided with pivot-points $f\,f$, arranged intermediate of its ends and which are shaped so as to present knife-edges that pivot or rest in the arms of the hanger H, thereby effecting a suspension of the beam that presents arms of unequal length. These arms are divided by scale-graduations or weighing-points, the larger arm bearing the divisions indicating pounds and which extend in progression from the point of fulcrum toward the end, while the short-arm divisions serve as ounce-graduations and are reckoned from the end toward the fulcrum to indicate the subdivisions of one pound. The arms thus disposed and marked are provided with poises or weight-balancers, which carry the indicator fingers or pointers $p\,p'$. From the beam ends extend uprights $b\,b$, upon which are mounted a rotative cylinder or drum D, which is made, preferably, of thin metal.

E represents a casing that is arranged to inclose said cylinder and which is provided with a slot portion that extends lengthwise thereof and is so located as to expose the central portion of said cylinder to admit of bringing to view the horizontal lines of figures as required. F represents a stationary indicator-column that is mounted on said casing at the top, so as to extend lengthwise of the said casing just above the slot-opening and which affords a convenient location for a supplemental tabulation of computations.

A scale-pan L is suspended from beam at g. The weighing-beam and attachments thus arranged are initially balanced in a horizontal equilibrium by reason of a movable counterbalance-weight G, which is attached to a depending arm at the end of the short arm and which by being mounted to rotate on a screw can be revolved either one way or the other to obtain the most delicate adjustment between the balanced lever-arms. This counterbalance is shown as provided with a retaining-screw S', that can be used to seat the weight in a given position, so that it will not slip to increase or diminish the leverage required to establish and maintain a perfect equilibrium. The cylinder above referred to is so disposed that the periphery thereof is relatively arranged to extend along the path of the beam and in proximity thereto. The periphery of said cylinder is divided into two sections, each of which corresponds in length with that of the adjacent scale-graduations on the arms. These sections are divided into lines and spaces. The section opposite the long arm is divided into lines and spaces that extend in a series of longitudinal lines about the periphery of the cylinder, said spaces corresponding in number on each line with the number of pound-divisions on said weighing-arm, which spaces are provided with appropriate figures arranged in progression to indicate the multiples of the price rate that is indicated on the same line as the first and lowest number of the cross-series. The figures on these lines are so spaced that they aline with the scale-graduations on the scale-beam opposite, so that when the poise P is slid along the beam to a predetermined weighing-point the perpendicular indicator or pointer p thereon indicates the figures of computation for such weight at the price rate exposed. The section opposite the short arm is likewise divided into lines and spaces that form horizontal extensions in alinement with those bearing the price rate and which are divided into units to agree in subdivision with the number indicating the price rate.

Extending horizontally above the cylinder, as above referred to, is a column that bears on its lower portion a supplemental tabulation, while at the top, extending in lengths equal to the section formed on the cylinder, are spaces that indicate on the top line computations based on the use with the price rate of the fraction "½," while those on the next line indicate computations based on the use with the price rate of the fraction "¼," the use of which will be better understood by examples to be hereinafter described.

The operation of my improved scale is as follows: The weights or poises being in the usual position the scale-beam will be accurately balanced. Suppose now it is desired to weigh off a quantity of any article or commodity. The rotary cylinder is revolved by turning the thumb-piece S so as to expose the price rate required. The sliding weight is then moved to the weight-point sought, and the article is weighed as usual. The operator will note that the pointers of the poise aline with a certain figure on the face of the cylinder opposite, and he is at once apprised of the price of the article weighed. Thus, for instance, to ascertain the cost of three-fourths of a pound of merchandise at the rate of sixteen cents per pound all the seller has to do after weighing that amount off on the ounce side of the scale, as indicated in Fig. 1, is to rotate the cylinder until the rate price of sixteen is brought into view and then glance along the cross-line extending therefrom until he reaches the space indicated by the pointer on the small poise, where he will find the cent-space indicated, which in this example proves to be the twelfth, and he is thereby informed without any mental labor that twelve ounces estimated at the rate of sixteen cents per pound amounts to twelve cents. When the commodity to be weighed amounts to more than one pound—as, for instance, five pounds—the poise on the pound-arm is moved to the weighing-point indicated by the numeral "5," as shown in Fig. 2, while the indicator-finger alines with said numeral on the arm indicating the exact weight, as well as with the face of the cylinder, which indicates the total price amount and which, at the rate of sixteen cents per pound, as illustrated in the example, proves to be eighty cents. These calculations just referred to are limited to the use of the cylinder alone. There is a limit to the tabulation capacity of the said cylinder embodying the above-described system of computation, because in enlarging the cylinder to give it a capacity to indicate a long series of figures or totals its size must necessarily be increased to such an extent as to render it an encumbrance that is unwieldy on a balance-frame. To avoid this, the first provision made is that of occupying the central space on the cylinder with the added series of totals; but these are employed in a machine of the size depicted only when weights are added to the platform, and the second provision made is that of utilizing a stationary column F as an adjunct to the said cylinder to give greater range of computation.

It will be seen on inspecting Fig. 3 that the column F is provided on its lower portion with a progressive series of numbers that are the multiples of twenty, (the price rate, which is located on the extreme left of the line in said section,) and should the vender wish to compute a given number of pounds—say ten pounds—at thirty-six cents a pound he will find that the range of the price rates on the machine of this size does not include so high a rate; but by turning the cylinder to bring to view the sixteen-cent rate and by referring to the twenty-cent rate on the column he will have the equivalent of thirty-six cents, and ten pounds computed at said rate may be arrived at by reference to the numerals in the two columns arranged in alinement with the indicating-finger on the poise, which is in this example "160" plus "200," which is equal to three hundred and sixty, or three dollars and sixty cents.

In the foregoing examples the method of ascertaining the computed price has had reference to a given weight of merchandise expressed in units of a single denomination of measure, either in pounds or ounces, while the price rate involved simply the use of a whole number; but in Fig. 4 is illustrated a computation more complex in nature, in which the weight is expressed as a compound of pounds and ounces and the price rate is calculated by units and fractions thereof; but in this kind of an example the result can be readily and easily obtained by the use of the cylinder and with the aid of the graduations and figures on the stationary column. Let the example be to ascertain the cost price of merchandise that weighs five pounds and four ounces, at thirty-six and one-half cents per pound. By moving the poises to those weighing-points indicated on the respective arms and by exposing the sixteen-cent price rate and following the plan pursued in the previous example for obtaining a thirty-six-cent rate and the totals thereof the operator can then proceed by footing those totals up indicated in alinement with the pointer on the pound side, which are in this instance "80" plus "100," while the fractional product is ascertained by reference to the top line, or "one-half fraction line," as it is called, where it will be observed that the space in alinement with said indicator forms in the cross-series a multiple of the fraction one-half that is the fifth in the series and amounts to two and one-half, which added to the "80" plus "100" completes the computation for that section of the cylinder, while by a like method the operation refers to and adds the amounts indicated in alinement with the indicator of the poise on the ounce side of the cylinder and column, which also includes the consideration of the fractional line. It is observed that the poise-indicator on this side alines with "4" on the cylinder and "5" on the lower tabulation of the column, while the point to which it indicates on the fractional line lies just to the left of the "⅛" subdivision, which is approximately one-tenth. These totals added together and combined with the product already obtained result in a total of 191.6, the correct amount.

Having thus described my invention, what I claim as new, and desire to secure by Letters Patent, is—

1. The combination with a scale-beam having its fulcrum-point at a point between its ends to provide unequal arms, the shorter arm bearing the load-supporting pivot and the longer arm carrying the counterpoise-platform, weighing-points indicated on each arm which bear each a series of figures in progression indicating ounces and pounds respectively, and each of said arms bearing poises; of a rotatable cylinder extending along the path of said scale-beam, which is provided with two or more sections of tabulations or price-computations, that are arranged with reference to the weighing-points on the respective arms; and a counterpoise arranged to compensate for the general adjustment of the whole balance-frame substantially as described.

2. The combination with a scale-beam, having its fulcrum-point located at a point between its ends to provide unequal arms, the shorter arm bearing the load-supporting pivot, and the longer arm carrying the counterpoise-platform, weighing-points indicated on each arm which bear a series of figures in progression that are arranged to extend from left to right for indicating ounces and pounds respectively, and each of said arms bearing poises; of a rotatable cylinder extending along the path of said scale-beam which is provided with two or more sections of tabulations or price-computations, and a columns attachment on said cylinder bearing a tabulation of computations on its lower portion, and a fractional scale on its upper portion, each of said tabulations being arranged with reference to the weighing-points on the respective arms; and a counterpoise arranged to compensate for the general adjustment of the whole balance-frame, substantially as described.

In testimony whereof I affix my signature in presence of two witnesses.

THOMAS JOSEPH DUNLEA.

Witnesses:
A. H. FALKENBURY,
C. W. GLIDDEN.